United States Patent
Dawes et al.

(10) Patent No.: US 11,024,296 B2
(45) Date of Patent: *Jun. 1, 2021

(54) SYSTEMS AND METHODS FOR CONVERSATIONS WITH DEVICES ABOUT MEDIA USING INTERRUPTIONS AND CHANGES OF SUBJECTS

(71) Applicant: Rovi Guides, Inc., San Jose, CA (US)

(72) Inventors: Charles Dawes, Ryton (GB); Walter R. Klappert, North Hollywood, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,609

(22) Filed: Mar. 11, 2020

(65) Prior Publication Data
US 2020/0302920 A1 Sep. 24, 2020

Related U.S. Application Data

(63) Continuation of application No. 16/379,312, filed on Apr. 9, 2019, now Pat. No. 10,629,187, which is a continuation of application No. 14/757,910, filed on Dec. 23, 2015, now Pat. No. 10,311,862.

(51) Int. Cl.
*G10L 15/18* (2013.01)
*G10L 15/22* (2006.01)

(52) U.S. Cl.
CPC ........ *G10L 15/1815* (2013.01); *G10L 15/222* (2013.01)

(58) Field of Classification Search
CPC .... G10L 15/00; G10L 15/1815; G10L 15/222
USPC ........ 704/257, 8, 9, 275, 277, 274, 254, 35; 370/352; 707/759
See application file for complete search history.

(56) References Cited

U.S. PATENT DOCUMENTS

| | | | | |
|---|---|---|---|---|
| 5,930,751 A | * | 7/1999 | Cohrs | G10L 15/22 704/231 |
| 6,397,186 B1 | * | 5/2002 | Bush | G06F 3/167 704/274 |
| 6,496,799 B1 | * | 12/2002 | Pickering | G10L 15/04 704/235 |
| 6,721,706 B1 | * | 4/2004 | Strubbe | G10L 15/18 704/275 |
| 7,324,947 B2 | * | 1/2008 | Jordan | H04N 21/47214 704/275 |

(Continued)

*Primary Examiner* — Michael Colucci
(74) *Attorney, Agent, or Firm* — Haley Guiliano LLP

(57) ABSTRACT

Systems and methods are described herein for providing media guidance. Control circuitry may receive a first voice input and access a database of topics to identify a first topic associated with the first voice input. A user interface may generate a first response to the first voice input, and subsequent to generating the first response, the control circuitry may receive a second voice input. The control circuitry may determine a match between the second voice input and an interruption input such as a period of silence or a keyword or a phrase, such as "Ahh,", "Umm,", or "Hmm." The user interface may generate a second response that is associated with a second topic related to the first topic. By interrupting the conversation and changing the subject from time to time, media guidance systems can appear to be more intelligent and human.

20 Claims, 10 Drawing Sheets

(56) References Cited

U.S. PATENT DOCUMENTS

| | | | |
|---|---|---|---|
| 7,720,683 B1 * | 5/2010 | Vermeulen | G10L 15/22 704/254 |
| 8,060,525 B2 | 11/2011 | Svendsen et al. | |
| 8,510,247 B1 | 8/2013 | Kane, Jr. et al. | |
| 8,577,671 B1 * | 11/2013 | Barve | G06F 16/84 704/9 |
| 8,645,122 B1 * | 2/2014 | Di Fabbrizio | G06F 40/20 704/9 |
| 8,843,372 B1 * | 9/2014 | Isenberg | G10L 25/48 704/250 |
| 8,935,163 B2 | 1/2015 | Huang et al. | |
| 9,378,740 B1 * | 6/2016 | Rosen | G10L 15/1822 |
| 9,465,833 B2 | 10/2016 | Aravamudan et al. | |
| 2003/0125945 A1 * | 7/2003 | Doyle | G10L 15/01 704/246 |
| 2004/0006483 A1 * | 1/2004 | Sasaki | G10L 15/22 704/277 |
| 2004/0100582 A1 * | 5/2004 | Stanger | H04N 21/8547 348/515 |
| 2007/0005361 A1 * | 1/2007 | Huning | G10L 15/32 704/251 |
| 2008/0046229 A1 * | 2/2008 | Maskey | G06F 40/289 704/2 |
| 2008/0059188 A1 * | 3/2008 | Konopka | G10L 15/22 704/257 |
| 2010/0262449 A1 | 10/2010 | Monteforte et al. | |
| 2011/0060587 A1 * | 3/2011 | Phillips | G10L 15/30 704/235 |
| 2013/0154797 A1 | 6/2013 | Lee et al. | |
| 2013/0268260 A1 * | 10/2013 | Lundberg | G06F 40/40 704/8 |
| 2014/0046891 A1 * | 2/2014 | Banas | G06N 5/022 706/46 |
| 2014/0282645 A1 | 9/2014 | Hammond | |
| 2014/0337370 A1 * | 11/2014 | Aravamudan | G06F 16/433 707/759 |
| 2015/0039316 A1 * | 2/2015 | Tzirkel-Hancock | G10L 15/1815 704/275 |
| 2015/0142704 A1 * | 5/2015 | London | G06F 40/58 706/11 |
| 2016/0065884 A1 * | 3/2016 | Di Censo | G06F 3/005 386/227 |
| 2016/0269524 A1 * | 9/2016 | Stottlemyer | H04B 1/3822 |
| 2017/0061989 A1 * | 3/2017 | Dow | G06K 9/00315 |
| 2017/0116986 A1 * | 4/2017 | Weng | G10L 15/22 |
| 2017/0147576 A1 * | 5/2017 | Des Jardins | G06F 16/48 |

* cited by examiner

SYSTEMS AND METHODS FOR CONVERSATIONS WITH DEVICES ABOUT MEDIA USING INTERRUPTIONS AND CHANGES OF SUBJECTS

CROSS-REFERENCE TO RELATED APPLICATIONS

This application is a continuation of U.S. patent application Ser. No. 16/379,312, filed Apr. 9, 2019 (allowed), which is a continuation of U.S. patent application Ser. No. 14/757,910, filed Dec. 23, 2015, now U.S. Pat. No. 10,311,862, which are hereby incorporated by reference herein in their entireties.

BACKGROUND

Media guidance systems may include a voice interactive feature by which a user can provide voice commands and queries to the media guidance system. The media guidance system may respond, through either text or a machine-generated voice, with a related answer or topic. For instance, a user may request recommendations for popular action movies, and the media guidance system may access a database (such as the Apple Store or Google Play store), download a list of the top ten action movies, and provide the list to the user. The media guidance system may further improve the relevance of its responses by referencing a Knowledge Graph, which includes a semantic network that maintains relationships between certain topics and/or ideas.

In this manner, traditional media guidance systems have employed a "turn-based" approach, wherein a user and the media guidance system take turns providing queries and answers. However, such a turn-based approach can sometimes appear to be rigid or robotic.

SUMMARY

Accordingly, systems and methods for conversations with devices about media using interruption and changes of subjects are described herein. A media guidance application may interact with a user through a voice interface in an interactive conversation, wherein the user speaks a voice command and the media guidance application response with a spoken response. The media guidance application may, among other things, provide media guidance and recommendations to the user through the voice interface. For example, a user may state, "Rachael, what should I watch tonight?" The media guidance application may reply with "I think you should try the new Bond movie." The media guidance application may also detect when the user hesitates and interrupts or changes the subject. For example, continuing with the previous example, the user may say "hmm . . . .", indicating some hesitation with the media guidance application's recommendation of a Bond movie. The media guidance application, detecting this hesitation, may interrupt and change the subject, stating "How about Mission Impossible 3?" By interrupting the conversation and changing the subject from time to time, media guidance systems can appear to be more intelligent and human.

According to one aspect, systems and methods are described herein for providing media guidance. According to one aspect, control circuitry may receive a first voice input. The control circuitry may access a database of topics, the database of topics including a semantic network indicating relationships between a plurality of topics and identify a first topic from the database of topics that is associated with the first voice input. For example, the database of topics may be a Knowledge Graph that maintains relationships between topics/ideas. Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties.

A user interface may generate a first response to the first voice input, and subsequent to generating the first response, the control circuitry may receive a second voice input. The control circuitry may compare the second voice input to a list of interruption inputs to determine a match between the second voice input and an interruption input from the list of interruption inputs. Interruption inputs may include, for example, a period of silence or a keyword or a phrase, such as "Ahh,", "Umm,", "Hmm," or the like. In response to determining the match between the second voice input and the interruption input, the user interface may generate a second response to the first voice input, wherein the second response is associated with a second topic from the database of topics that is associated with the first topic.

In some embodiments, the control circuitry may also extract, from the database, relationships between the first topic and a remainder of the plurality of topics in order to select the second topic. The control circuitry may compare each of the relationships between the first topic and the remainder of the plurality of topics to a relationship threshold and store to memory a list indicating a subset of the relationships between the first topic and the remainder of the plurality of topics that do not exceed the relationship threshold and a list of topics of the plurality of topics that correspond to the subset of the relationships. The second topic may then be selected from the list of topics. In this manner, the second topic may be chosen so that it is related to the topic of the user's original query.

In some embodiments, the semantic network includes numerical relationships between the plurality of topics, the numerical relationships indicating a statistical likelihood that the second topic is related to the first topic. For example, the statistical likelihood may be determined by monitoring a plurality of voice inputs from a plurality of users. Of the plurality of voice inputs, a first subset could be identified that relate to a first topic, and of the first subset, a smaller second subset can be identified that relates to the second topic. From the first and the second subset, a probability that the second topic follows the first topic may be determined and may form the basis of the statistical likelihood and/or relationship between the first topic and the second topic. Other methods of determining and maintaining relationships in a database, semantic network, and/or Knowledge Graph are contemplated, as will be understood by those of ordinary skill in the art.

The second response may further take into account a user's media preferences. For example, the control circuitry may access a user profile indicating media preferences of a user. A genre preference may be retrieved from the user profile, and the control circuitry may identify a subset of the plurality of topics that are associated with the retrieved genre. The second topic may then be selected from the subset of the plurality of topics. Other methods of selecting the second topic may be contemplated. For instance, the user profile, as discussed herein, may include other information about the user's media preferences, including, but not limited to, ratings information, favorite actor information, preferred media format (e.g., standard definition, high definition, 3D, etc.), and preferred media category, among others. In some embodiments, the database of topics may indicate, for each of the plurality of topics, a genre associated with each respective topic. The control circuitry may extract, from the database of topics, a genre associated with the first topic and identify a subset of the plurality of topics that are associated with the extracted genre. The second topic may then be selected from the subset of the plurality of topics.

In some embodiments, it may not be desirable to interrupt or change the subject of a conversation with high frequency. For instance, some users may prefer little or no interruptions when interacting with the media guidance system. In some embodiments, the control circuitry may receive a third voice input and compare the third voice input to the list of interruption inputs to determine a match between the third voice input and a second interruption input from the list of interruption inputs. The control circuitry may determine whether an interruption threshold period of time has elapsed between a current time and the second response. In some embodiments, the interruption threshold period of time may be specified by the user and may be a minimum period of time that the media guidance system must wait before interrupting or changing the subject. In some embodiments, the interruption threshold period of time may represent an average time between interruptions, such that the media guidance system is allowed flexibility to interrupt the user at any time, as long as, on average, the time between interruptions does not fall below the average time. The control circuitry may, in response to determining that the interruption threshold period of time has elapsed between the current time and the second response, generate a third response to the first voice input, wherein the third response is associated with a third topic from the database of topics that is associated with the first topic.

In some embodiments, a voice personality profile may store certain user preferences regarding, among others, how often a media guidance application may interrupt or change the subject of a conversation and how far the media guidance application may deviate from a current topic. The control circuitry may receive an indication of a user associated with the first voice input. The control circuitry may then access a plurality of voice personality profiles, each voice personality profile corresponding to a respective user and including indications of a plurality of interruption inputs and select one of the plurality of voice personality profiles based on the indication of the user associated with the first voice input. In order to identify an interruption input in the second voice input, the control circuitry may compare the second voice input to the list of interruption inputs from the selected voice personality profile. For example, one user may often use "Ahh . . . " when pausing, while another user may often use "Hmm . . . " when pausing, and the media guidance application may maintain different voice personality profiles for each of these users. In some embodiments, the voice personality profiles may output responses in different voices. For example, one voice personality profile may sound like a man when responding to a user, while another voice personality profile may sound like a woman.

In some embodiments, the control circuitry may limit the frequency or number of times the control circuitry interrupts the conversation based on an interruption threshold period of time. The control circuitry may extract the interruption threshold period of time from a voice personality profile. The control circuitry may calculate a time elapsed since the first voice input by comparing a current time to a time associated with the first voice input. The control circuitry may only generate the second response in this embodiment if the time elapsed has exceeded the interruption threshold period of time.

As an illustrative example, a user may invoke the media guidance application and say "Rachael, suggest a video, please." The user's reference to "Rachael" may cause the guidance system to load a specific artificial personality called "Rachael." This personality may use a specific female voice to interact with the user and may also indicate (1) an interruption threshold period of time that controls how frequently to interrupt the conversation; and (2) a relationship threshold that indicates how far "Rachael" is allowed to move away from the current subject when interrupting or changing the subject.

Rachael may reply, "You were one hour and eighteen minutes into NOVA's 'Becoming Human—Part 1.' Would you like to watch the rest of this program?" The user may respond with, "Ah . . . " The media guidance system may detect the word "Ah" as an interruption input and determine that it is a suitable time to interrupt. Rachael, interrupting the conversation, may then state "Alternatively, the Smithsonian Channel has a similar program called 'Smithsonian Spotlight: Human Origins.' How about this program?" The media guidance application may have accessed a Knowledge Graph to determine that the Smithsonian program is related to the NOVA program. The user may respond to the recommendation of the Smithsonian program with two seconds of silence. The media guidance application may identify the silence as another interruption point. However, this time, Rachael may respond with: "How about something completely different?" indicating whether the media guidance system may suggest a topic which exceeds the relationship threshold. In this manner, the media guidance application may, in some embodiments, query the user for permission to exceed the relationship threshold after one or more unsuccessful recommendations.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
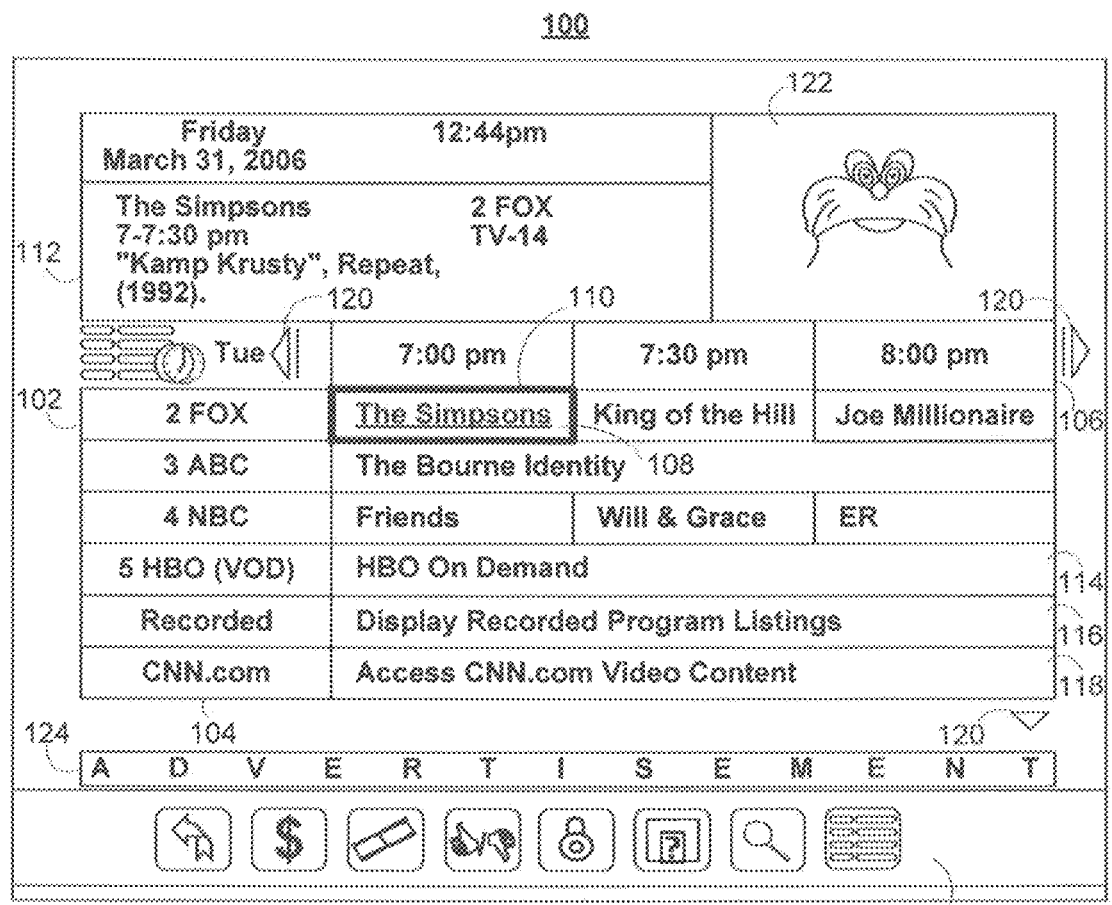
FIG. 1 shows an illustrative example of a display screen for use in accessing media content in accordance with some embodiments of the disclosure.

Systems and methods for conversations with devices about media using interruption and changes of subjects are described herein. A media guidance application may interact with a user through a voice interface in an interactive conversation, wherein the user speaks a voice command and the media guidance application response with a spoken response. The media guidance application may, among other things, provide media guidance and recommendations to the user through the voice interface. The media guidance application may also detect when the user hesitates and interrupts or changes the subject at that point. The media guidance may change the subject to a topic that is related to the user's original query to provide more relevant answers to the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, the media guidance data may include a semantic network that maintains relationships between topics, ideas, and/or concepts. As will be understood by those of ordinary skill in the art, a semantic network or semantic graph may include a directed or undirected graph consisting of vertices, which represent topics, ideas, or concepts, and edges which represent the relationships between the concepts. In some embodiments, the semantic network may include a Knowledge Graph. The semantic network may be populated using any suitable approach. For instance, in some embodiments, the relationships may include numeric values indicating the similarity between different topics, ideas, or concepts.

The media guidance data may also include one or more voice personality profiles including at least a relationship threshold and an interruption threshold period of time. The relationship threshold may indicate a "distance" that a media guidance application may deviate from a current subject when interrupting or changing the subject. For example, in embodiments where a semantic network includes relationships including numeric values between the vertices, the relationship threshold may be a maximum value between a first topic and a second topic, so that the media guidance application does not deviate beyond the relationship threshold when interrupting or changing the subject. The interruption threshold period of time may indicate a frequency with which the media guidance application may interrupt or change the subject of a conversation. In some embodiments, the interruption threshold period of time may represent a minimum amount of time that must pass between subsequent interruptions of the conversation. In other embodiments, the interruption threshold period of time may represent an average amount of time between subsequent interruptions. Thus, in these embodiments, the time between certain interruptions may be less than the interruption threshold period of time, so long as, on average, the time between interruptions is kept at or above the interruption threshold period of time.

Figure 2:
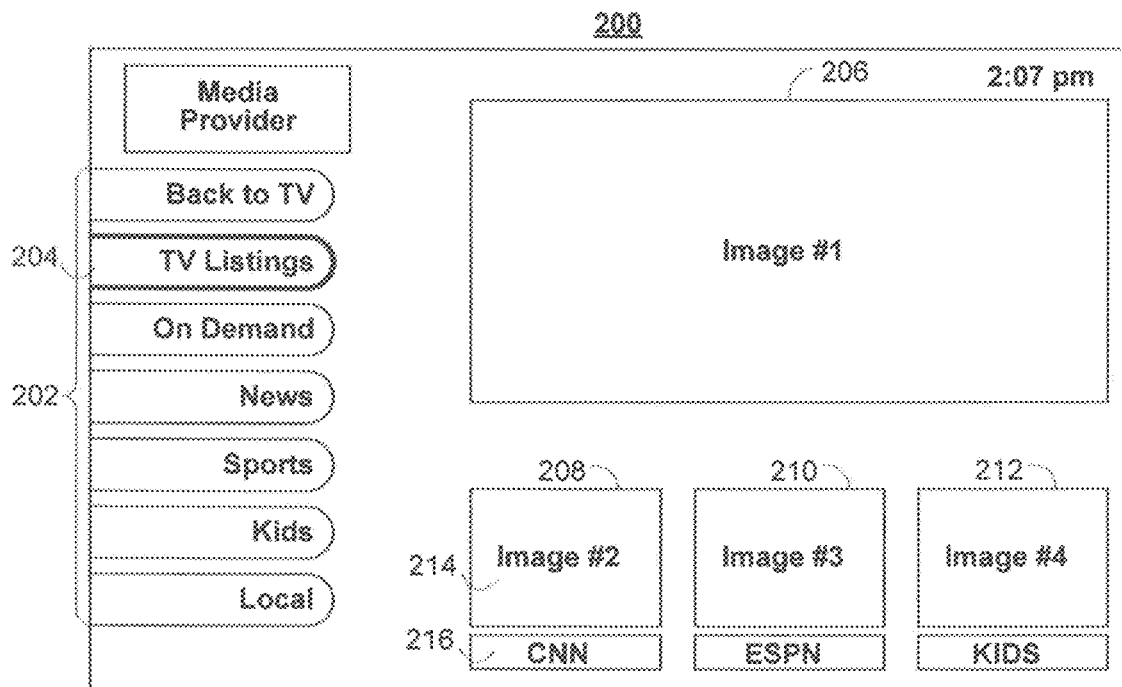
FIG. 2 shows another illustrative example of a display screen used to access media content in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options. The options may also include the ability to select one of a plurality of voice personality profiles, each voice personality profiles including at least an indication of a relationship threshold and an interruption threshold period of time. In some embodiments, the voice personality profile also includes a specific voice for providing responses to the user as well as pointers to a user's preference profile. In this manner, a user may choose the "personality" of the media guidance application that he or she will be interacting with, with each "personality" comprising parameters that determine how often the personality may interrupt the user and how far the personality may stray from a current topic when changing the subject of a conversation.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
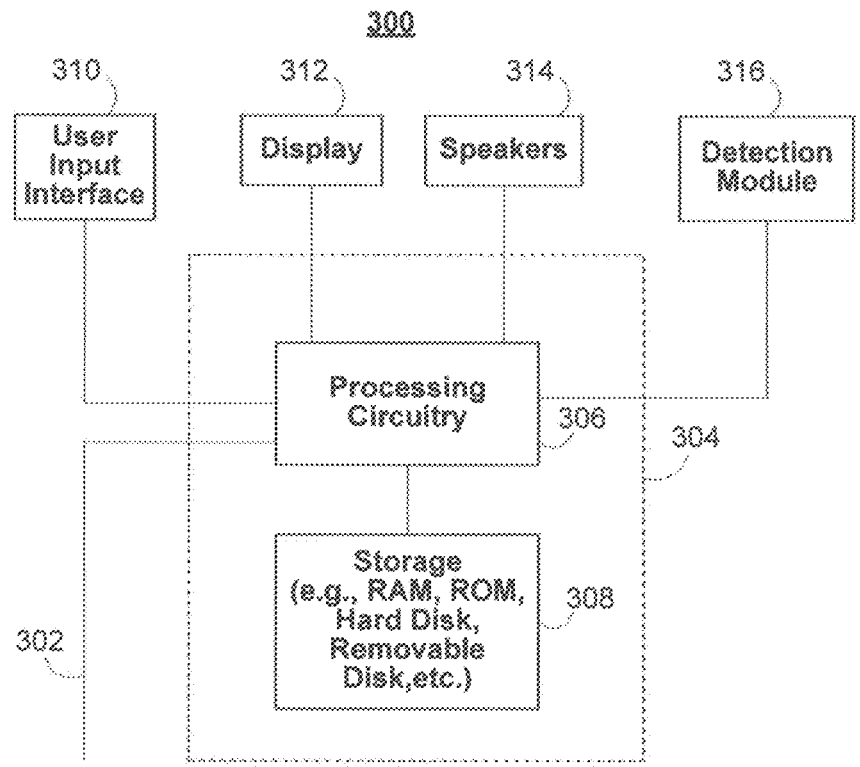
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core 17 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

The control circuitry 304 may also include audio comparison circuitry suitable for recognizing voice inputs by a user, converting the voice input into text, and comparing the voice input to a database of interruption inputs. For example, the control circuitry 304 may include dedicated hardware to perform audio processing algorithms and/or audio recognition and comparison software. The control circuitry 304 may access and run audio processing software stored on storage, such as storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

Detection module 316, or the detection module circuitry, may be incorporated into, coupled to, or accessible by the media guidance application (such as control circuitry 304). Detection module 316 may be used, among other things, to detect user voice inputs. For example the detection module 316 may capture audio signals and identify when a user is speaking to the media guidance application. In some embodiments, the detection module 316 may establish a baseline signal, such as a period of silence or background noise, by monitoring an audio signal before the user input. The detection module 316 may detect the user voice input by detecting that the audio signal deviates past a threshold value between a start and an end time. In some embodiments, the media guidance application may distinguish between whether the user is speaking specifically to the media guidance application or to someone else. For example, the media guidance application may employ the use of keywords, such as a name of the media guidance application, that acts as a trigger for the detection module 316 to begin listening for a user voice input. In such embodiments, the media guidance application may run, in real time, audio recognition software that can detect spoken words in a monitored audio signal. In response to detecting the keyword, the media guidance application may start detecting a user voice input. The media guidance application may determine the end of the user voice input by detecting a period of silence or by detecting a different keyword.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
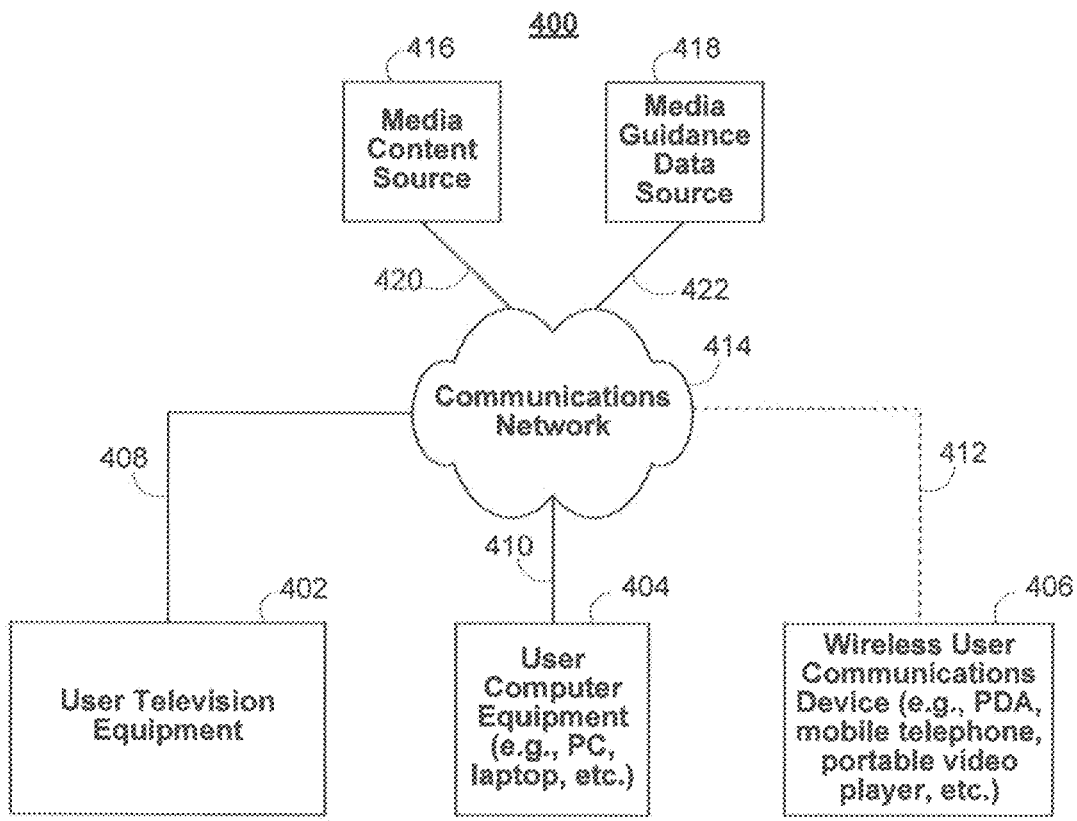
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422' may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, media guidance data source 418 may store a database of topics including a semantic network. Upon request, media guidance data source 418 may access the database and transmit a list of topics or a subset of topics related to a first topic. Media guidance data source 418 may also search the database of topics for topics related to the first topic.

Media guidance data source 418 may also include a list of potential interruption inputs. For example, an interruption input may include a period of silence for a particular amount of time, a keyword, or a phrase, such as "Ah,", "Um,", "Hmm,", "No . . . ", or the like. The keywords and phrases may be populated by a system administrator or an end user and may include both text as well as audio samples. For instance, the list of potential interruption inputs may include a text list of the possible keywords that indicate an appropriate time for a media guidance application to interrupt or change the subject of a conversation. The list of interruption inputs may also include a plurality of audio samples of a generic male voice and/or a generic female voice that speak these keywords or phrases. In some embodiments, the media guidance data source 418 may store audio samples of the specific end user speaking the interruption keywords and phrases. The audio samples may be established, for example, in a setup or initialization procedure for the media guidance application.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

The media guidance application may provide media guidance and recommendation features to the user through a voice interface. For example, the media guidance application may hold a conversation with the user, where the user provides a voice query, the media guidance application provides a spoken answer, and so on. In this manner, the media guidance application and the user may hold a back-and-forth conversation related to a topic of the user's choice.

In some embodiments, the media guidance application may "interrupt" the user and/or change the subject of the conversation. For example, the user may pause or hesitate, and the media guidance application may detect this pause or hesitation and interject with another spoken response. In this manner, the media guidance application is breaking the "turn-based" approach of a traditional voice interface and allowing the media guidance application to provide several potential answers when the user indicates hesitation.

The media guidance application may maintain "personalities" that may be selected by the user. The different personalities may utilize different models, as discussed further below, that differ at least in the frequency with which they interrupt the user and how far the personality may stray from a current topic. For example, "Rachael" may be a personality that employs a female voice, interrupts with a normal frequency, and rarely strays from a current topic. For instance, if a user asked Rachael for recommendations for science fiction movies, Rachael may respond with "How about Star Trek?", and after five seconds of silence, may respond with "How about Star Wars?" In contrast, "Rambo" may employ a tough male voice that interrupts with high frequency and interrupts with wide changes in subject. For example, the user may ask Rambo for action movie recommendations. In response, Rambo may bombard the user with rapid-fire suggestions: "HOW ABOUT MISSION IMPOSSIBLE 3?? TOO SLOW!! HOW ABOUT INDEPENDENCE DAY??" The user may choose their preferred personality to interact with, or even create their own custom personality.

Figure 5:
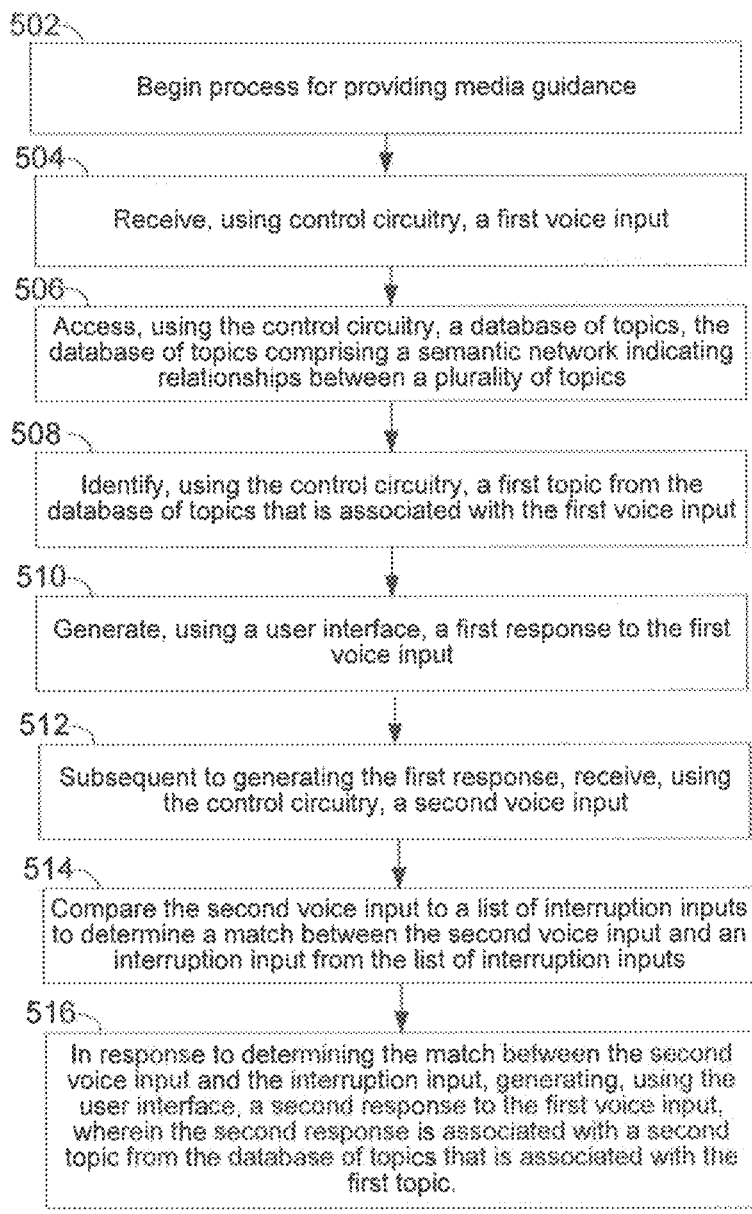
FIG. 5 is a flowchart of illustrative steps for providing media guidance in accordance with some embodiments of the disclosure.

FIG. 5 is a flowchart 500 of illustrative steps for control circuitry (such as control circuitry 304) to provide media guidance in accordance with some embodiments of the disclosure. Flowchart 500 describes control circuitry 304 receiving a first voice input, providing a first response, detecting an interruption point, and providing a second response that is related to a topic of the first voice input. In some embodiments, this process may be encoded on to non-transitory storage medium (such as storage device 308) as a set of instructions to be decoded and executed by processing circuitry (such as processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, image recognition and analysis circuitry, and the like.

At 502, the process to provide media guidance may begin. In some embodiments, the process may begin either directly or indirectly in response to a request from the user or a user action, such as an input into user input interface 310. For example, the process may begin directly in response to control circuitry 304 receiving signals from user input interface 310 or control circuitry 304 may prompt the user to confirm their input using a display (such as display 312) prior to running the process.

At 504, the control circuitry 304 may receive a first voice input. In some embodiments, the control circuitry 304 may receive the first voice input using audio recognition hardware, such as detection module 316. In some embodiments, the control circuitry 304 may also run audio recognition software in order to recognize the first voice input. At 506, the control circuitry 304 may access a database of topics, the database of topics including a semantic network indicating relationships between a plurality of topics. As discussed above, the semantic network may be populated in any suitable method and may indicate relationships in any suitable manner. In some embodiments, the semantic network may be a knowledge graph that represents topics as nodes/vertices in a directed or undirected graph and relationships as numerical values indicating the similarity or dissimilarity between topics.

At 508, the control circuitry 304 may identify a first topic from the database of topics that is associated with the first voice input. The control circuitry 304 may identify the first topic in any suitable manner. In some embodiments, as discussed below in relation to FIG. 8, the control circuitry 304 may use audio recognition software to extract keywords from the first voice input. The control circuitry 304 may compare these extracted keywords to keywords of topics associated with the first topic. For example, the database of topics may maintain, for each topic, a list of keywords associated with the topic. In some embodiments, the keywords themselves may be indicated as separate vertices/ nodes in the database of topics. The control circuitry 304 may identify a subset of topics and select, of the subset of topics, one topic that represents the closest match. For instance, the matching topic may represent the topic of the subset of topics that matches the most number of keywords extracted from the first voice input.

At 510, a user interface may generate a first response to the first voice input. The user interface may include speakers to output a voice response and/or a display for relaying text-based answers. The first response may be determined in any suitable manner. For example, as discussed below in relation to FIG. 9, the first response may be determined by identifying a topic related to the topic of the first voice input. As an illustrative example, the user may query, "Please recommend a popular sci-fi movie." The system may identify "science fiction" as the topic of the user's voice input, and may identify "Star Trek" as a topic related to "science fiction." After identifying the topic, the system may incorporate the related topic into a suitable response to the user's query. For example, the media guidance application may respond with "How about the Star Trek movie from 2009?"

At 512, subsequent to generating the first response, the control circuitry 304 may receive a second voice input. 512 may be substantially similar to 504. For instance, the control circuitry 304 may receive the second voice input using audio recognition hardware, such as detection module 316. In some embodiments, the control circuitry 304 may also run audio recognition software in order to recognize the second voice input.

At 514, the control circuitry 304 may monitor the second voice input to determine whether it includes an interruption input, indicating that it may be an appropriate time for the media guidance application to interject with a change of subject. To this end, the control circuitry 304 may compare the second voice input to a list of interruption inputs to determine a match between the second voice input and an interruption input from the list of interruption inputs. The control circuitry 304 may retrieve the list of interruption inputs from any suitable storage, such as local storage 308 or remote storage, such as media guidance data source 418. The control circuitry 304 may extract one or more keywords from the second voice input. For example, the control circuitry 304 may utilize audio recognition software to convert the second voice input into text and parse the text into keywords or phrases. The control circuitry 304 may then compare the extracted keywords to the interruption inputs from the list of interruption inputs. In some embodiments, the comparison includes a text-to-text search of the extracted keywords and the text of the interruption inputs. Any other suitable comparison is contemplated, including audio-to-text, text-to-audio, and audio-to-audio comparisons. For example, the list of interruption inputs may include both a text representation of the keyword as well as one or more associated audio samples of a human speaking the keyword. The control circuitry 304 may perform a direct audio comparison between the second voice input and the audio samples in the list of interruption inputs in order to identify a match.

At 516, the control circuitry 304 may, in response to determining a match between the second voice input and the interruption input, generate a second response to the first voice input. In some embodiments, the second response to the first voice input may be determined in much the same way as the first response from 510. The second response may be associated with a second topic from the database of topics that is associated with the first topic. The control circuitry 304 may access the database of topics and identify a subset of topics that are within a relationship threshold of the first topic of the first voice input. The control circuitry 304 may select one topic from the subset of topics and form a response based on the topic, as discussed above in relation to 510 and below in relation with FIG. 12.

Figure 6:
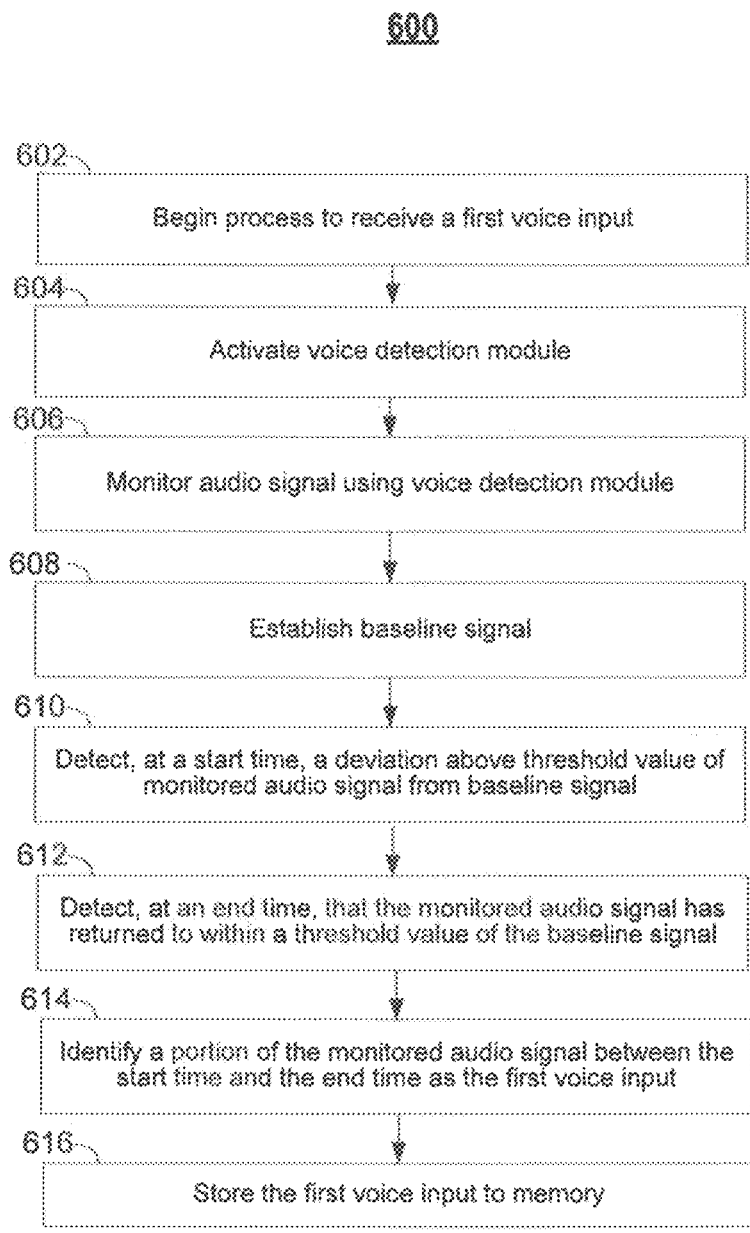
FIG. 6 is a flowchart of illustrative steps for receiving a first voice input in accordance with some embodiments of the disclosure.

FIG. 6 is a flowchart 600 of illustrative steps for receiving a first voice input. Flowchart 600 describes that steps that control circuitry 304 would take to receive and store the first voice input to memory. At 602, the process to receive a first voice input may begin. In some embodiments, the process may begin either directly or indirectly in response to a request from the user or a user action, such as an input into user input interface 310. For example, the process may begin directly in response to control circuitry 304 receiving signals from user input interface 310 or control circuitry 304 may prompt the user to confirm their input using a display (such as display 312) prior to running the process. In some embodiments, the control circuitry 304 may ping either local storage 308 or remote storage, such as media guidance data source 418, to determine whether the storage is available and ready to store the first voice input. The control circuitry 304 may also initialize any variables necessary to store the first voice input. For example, the control circuitry 304 may initialize an array in memory to store audio signals for successive time periods. In some embodiments, the control circuitry 304 may allocate a one-dimensional variable to continuously store a stream of audio.

At 604, the control circuitry may activate the voice detection module, such as detection module 316. For example, the voice detection module may include a microphone or any other audio detection hardware suitable for detecting and recording audio signals. At 606, the control circuitry 304 may monitor an audio signal using the voice detection module. For example, the control circuitry 304 may receive the audio signal using the voice detection module and store and/or continuously stream the audio signal to memory. At 608, the control circuitry 304 may establish a baseline signal. For instance, the control circuitry 304 may monitor a certain period of time of silence and/or background noise. As will be understood by those of skill in the art, suitable audio analytics, including performing low/high/band-pass filtering and/or transform analysis may be performed in order to identify and isolate the baseline signal.

At 610, the control circuitry 304 may detect, at a start time, a deviation above threshold value of monitored audio signal from baseline signal. For instance, the threshold value may include a threshold decibel level above silence, and the control circuitry 304 may detect that the monitored audio signal has exceeded that threshold decibel level, thus indicating the start of a voice input. In some embodiments, the control circuitry 304 may first remove the baseline signal using audio analysis techniques, as will be understood by those of skill in the art. As an illustrative example, the control circuitry 304 may develop a signature frequency profile of the baseline signal, representing the background noise. The control circuitry 304 may remove this signature frequency profile from a currently detected audio signal in order to remove the background noise, and may then detect whether the resulting audio signal exceeds a threshold value.

At 612, the control circuitry 304 may detect, at an end time, that the monitored audio signal has returned to within a threshold value of the baseline signal. For example, similar to 610 discussed above, the threshold value may be a threshold decibel level, and the control circuitry 304 may detect when the monitored audio signal drops below the threshold decibel level. As discussed above in 610, the control circuitry 304 may first remove a signature frequency profile of background noise from the monitored audio signal before determining whether the signal has dropped below the threshold value. In some embodiments, the control circuitry 304 detects whether there has been silence for a predetermined amount of time. For example, a period of silence of 1 s may indicate that the user has finished his or her query to the media guidance application. At 614, the control circuitry 304 may identify a portion of the monitored audio signal between the start time and the end time as the first voice input and store the first voice input to memory at 616.

Figure 7:
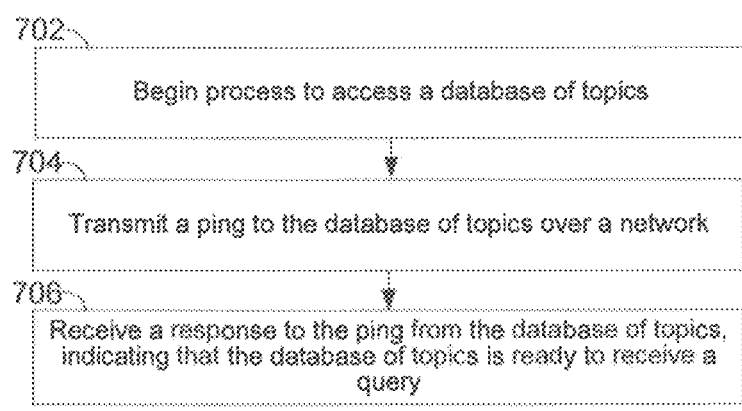
FIG. 7 is a flowchart of illustrative steps for accessing a database of topics in accordance with some embodiments of the disclosure.

FIG. 7 is a flowchart 700 of illustrative steps for accessing a database of topics. Flowchart 700 describes the steps that control circuitry 304 may take to access the database of topics. Control circuitry 304 may access the database of topics using any suitable method, and flowchart 700 is provided as an illustrative example only. For instance, as discussed above and throughout, the database of topics may include a semantic network such as a Knowledge Graph and may be stored either in local storage, such as storage 308, or in remote storage, such as media guidance data source 418. If the database of topics is stored in local storage 308, the control circuitry 304 may access the database through internal memory channels of the user equipment device 300. If the database of topics is stored in remote storage, such as media guidance data source 418, the control circuitry 304 may access the database through, for example, communications network 414, including, but not limited to, local area networks (LAN), the Internet, or a combination of the two.

At 702, the control circuitry may begin a process to access the database of topics, including any appropriate initialization and allocation routines. At 704, the control circuitry 304 may transmit a ping to the database of topics over a network. As discussed above, the network may include any type of network, including a local network, the Internet, or local memory channels. The ping may include a short data message that queries whether the database is ready to accept commands and/or data. At 706, the control circuitry 304 may receive a response to the ping from the database of topics, indicating that the database of topics is ready to receive a query. As with the ping, the response may be a short data message that indicates that the database is ready to accept commands and/or data.

Figure 8:
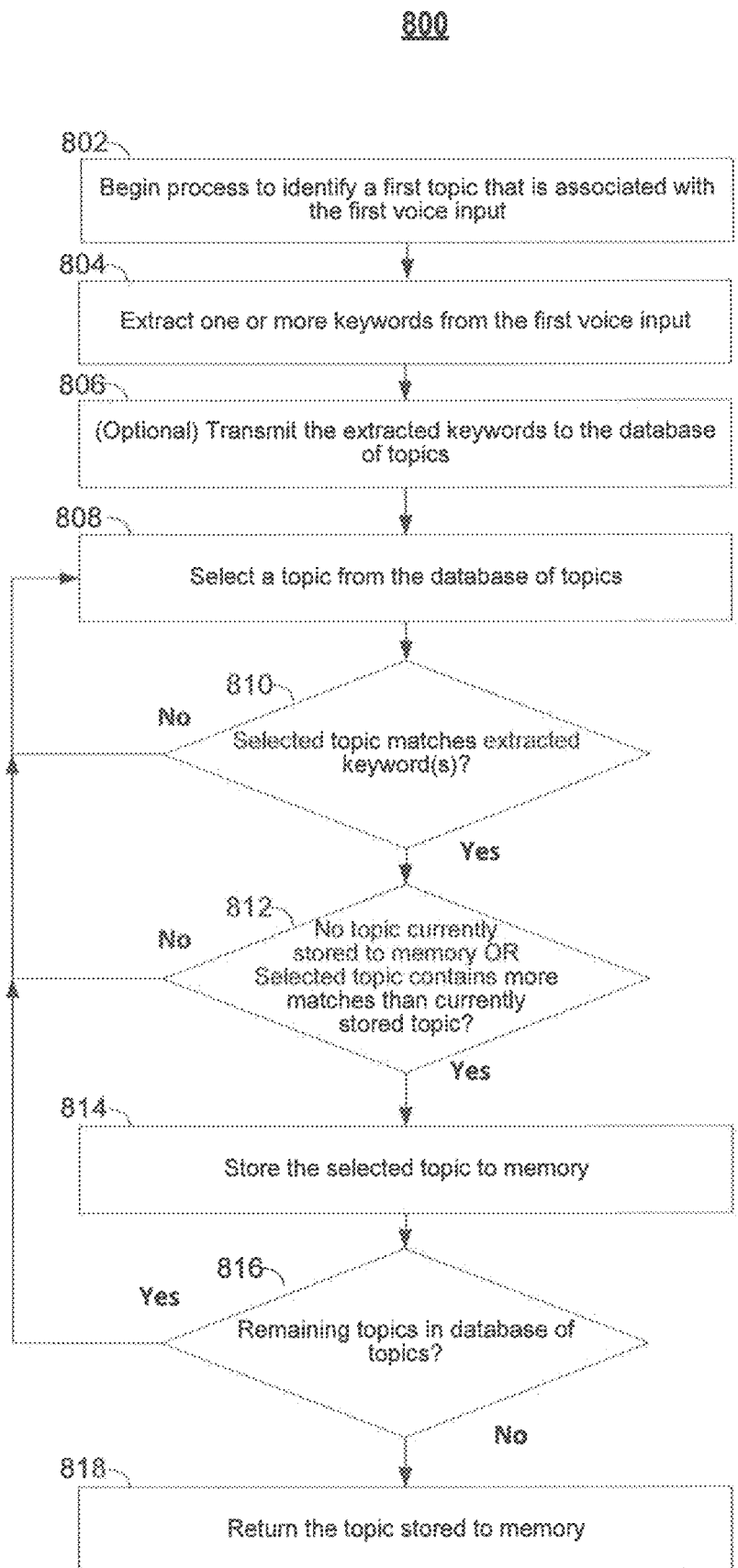
FIG. 8 is a flowchart of illustrative steps for identifying a first topic that is associated with the first voice input in accordance with some embodiments of the disclosure.

FIG. 8 is a flowchart 800 of illustrative steps for identifying a first topic that is associated with the first voice input. FIG. 8 describes an iterative process in which each of the topics in the database of topics is compared to the first voice input in order to determine the closest matching topic. At 802, the process to identify a first topic that is associated with the first voice input may begin. In some embodiments, the process may begin either directly or indirectly in response to a request from the user or a user action, such as an input into user input interface 310. For example, the process may begin directly in response to control circuitry 304 receiving signals from user input interface 310 or control circuitry 304 may prompt the user to confirm their input using a display (such as display 312) prior to running the process.

At 804, the control circuitry may extract one or more keywords from the first voice input. In some embodiments, extracting keywords from the first voice input may include converting the audio signal of the first voice input into a text format using suitable audio recognition software. The converted text may be parsed or grouped into suitable keywords and/or phrases. In some embodiments, the keywords may be extracted as audio samples of the first voice input. The control circuitry 304 may use suitable audio recognition software to separate the individual words and/or phrases spoken by the user in the first voice input. For instance, the control circuitry 304 may detect brief pauses or periods of silence in the first voice input to delineate words or phrases.

At 806, the control circuitry 304 may optionally transmit the extracted keywords to the database of topics, for example via network 414. In such embodiments, the control circuitry 304 may query the database of topics to identify the first topic, and the database of topics may perform the subsequent steps 808 to 816 and return the result to the control circuitry 304 via network 414.

At 808, the control circuitry 304 may select a topic from the database of topics, and at 810, determine whether the selected topic matches an extracted keyword(s). In some embodiments, the database of topics may list several keywords associated with the selected topic. These associated keywords may be compared to the extracted keywords using any suitable method, including a text-to-text comparison, text-to-audio comparison, audio-to-text comparison, or audio-to-audio comparison. If none of the extracted keywords match the keywords associated with the selected topic, then the control circuitry 304 may return to 808. If one or more keywords match, then the control circuitry may continue to 812.

At 812, the control circuitry 304 may determine whether the currently selected topic is the closest matching topic in the database of topics to the first voice input. To this end, the control circuitry 304 may determine either (1) no topic is currently stored to memory as a matching topic; or (2) the currently selected topic contains more matching keywords than the currently stored matching topic. If the control circuitry 304 determines that neither (1) nor (2) is true, then the control circuitry 304 may return to 808. If the control circuitry 304 determines that either (1), (2), or both are true, then the control circuitry 304 may continue to 814 and store the selected topic to memory as the current closest matching topic. At 816, the control circuitry 816 may determine whether there are any remaining topics in the database of topics to compare to the extracted keywords. If there are topics remaining, then the control circuitry 304 may return to 808 and select a different topic from the database of topics. If all topics have been compared against the extracted keywords, then the control circuitry 304 may, at 818, return the topic stored to memory as the result of the process. In this manner, the topic from the database of topics that most closely matches the keywords extracted from the first voice input is returned as the topic of the first voice input. As will be understood by those of skill in the art, FIG. 8 is provided for illustrative purposes only, and other methods for identifying a first topic of the first voice input may be utilized, as will be understood by those of ordinary skill in the art.

Figure 9:
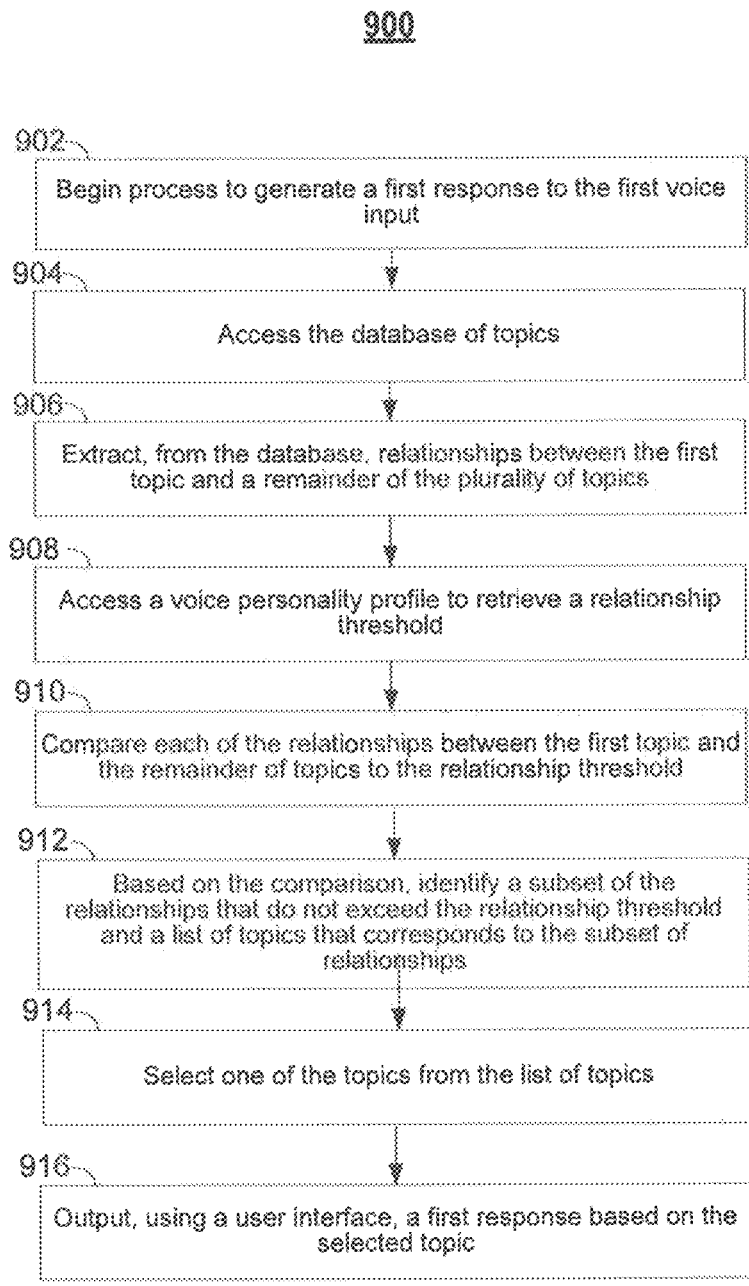
FIG. 9 is a flowchart of illustrative steps for generating a first response to the first voice input in accordance with some embodiments of the disclosure.

FIG. 9 is a flowchart 900 of illustrative steps for generating a first response to the first voice input. FIG. 9 describes the steps that control circuitry 304 may take to output a first response to the user's first voice input. At 902, the process to generating a first response to the first voice input may begin. In some embodiments, the process may begin either directly or indirectly in response to a request from the user or a user action, such as an input into user input interface 310. For example, the process may begin directly in response to control circuitry 304 receiving signals from user input interface 310 or control circuitry 304 may prompt the user to confirm their input using a display (such as display 312) prior to running the process.

At 904, the control circuitry 904 may access the database of topics. 904 may be substantially similar to 506 and/or process 700, as discussed above in relation to FIGS. 5 and 7, respectively. At 906, the control circuitry 304 may extract, from the database, relationships between the first topic and a remainder of the plurality of topics. As discussed above, the relationships may be kept in any suitable manner. For example, the relationships may be represented by numerical values between nodes of a Knowledge Graph. At 908, the control circuitry 904 may access a voice personality profile to retrieve a relationship threshold. As discussed above, the relationship threshold may be a metric that may be used to determine whether a first topic is related to a second topic. The voice personality profile may be stored either on local storage, such as storage 308 or remote storage, such as media guidance data source 418.

At 910, the control circuitry 304 may compare each of the relationships between the first topic and the remainder of topics to the relationship threshold. For example, in some embodiments, the comparison may include determining whether a numerical value of a particular relationship is greater than a numerical relationship threshold. At 912, the control circuitry may identify, based on the comparison, a subset of the relationships that do not exceed the relationship threshold and a list of topics that corresponds to the subset of relationships. These lists may represent the list of topics that are related to the first topics of the first voice input.

At 914, the control circuitry may select one of the topics from the list of topics. The control circuitry 304 may select the topic in any suitable manner. For example, the control circuitry may select the topic that is the closest match to the first topic, similar to 812 discussed above in relation to FIG. 8. In some embodiments, the control circuitry may incorporate a user's media preferences in the selection of a topic from the list of topics. For example, the control circuitry 304 may access a user profile, for instance stored on local storage 308, and extract one or more media preferences from the user profile. As an illustrative example, the control circuitry 304 may extract a genre preference of the user from the user profile. The control circuitry 304 may then further filter the subset of topics to those that satisfy the media preference of the user. Extending the illustrative example above, the control circuitry 304 may select only those topics that both relate to the first topic of the first voice input and that relates to a genre that is preferred by the user. In some embodiments, where a plurality of topics remains after all selection criteria have been applied, the control circuitry 304 may select one of the remaining topics at random. As will be understood by one of ordinary skill in the art, these examples are provided for illustrative purposes only, and the control circuitry 304 may select one of the topics using any suitable means.

At 916, the control circuitry 304 may output on a user interface a first response based on the selected topic. In some embodiments, 916 includes generating a full sentence based on the selected topic. In some embodiments, the control circuitry 304 may access a list of responses that have been previously authored by a human, wherein each of the list of responses leaves a blank to insert a relevant keyword. In such instances, the control circuitry 304 may access a list of keywords associated with the selected topic, select one of the responses from the list of responses, and input a keyword into the blank in order to compose the full sentence. As an illustrative example, the control circuitry 304 may select "How about _____?" as a potential response, and identify "Star Trek" as the selected topic. The control circuitry 304 may insert the key phrase "Star Trek" into the blank to compose the full sentence "How about Star Trek?" As will be understood by those of ordinary skill in the art, these examples are provided for illustrative purposes only, and other methods of outputting the first response may be contemplated.

Figure 10:
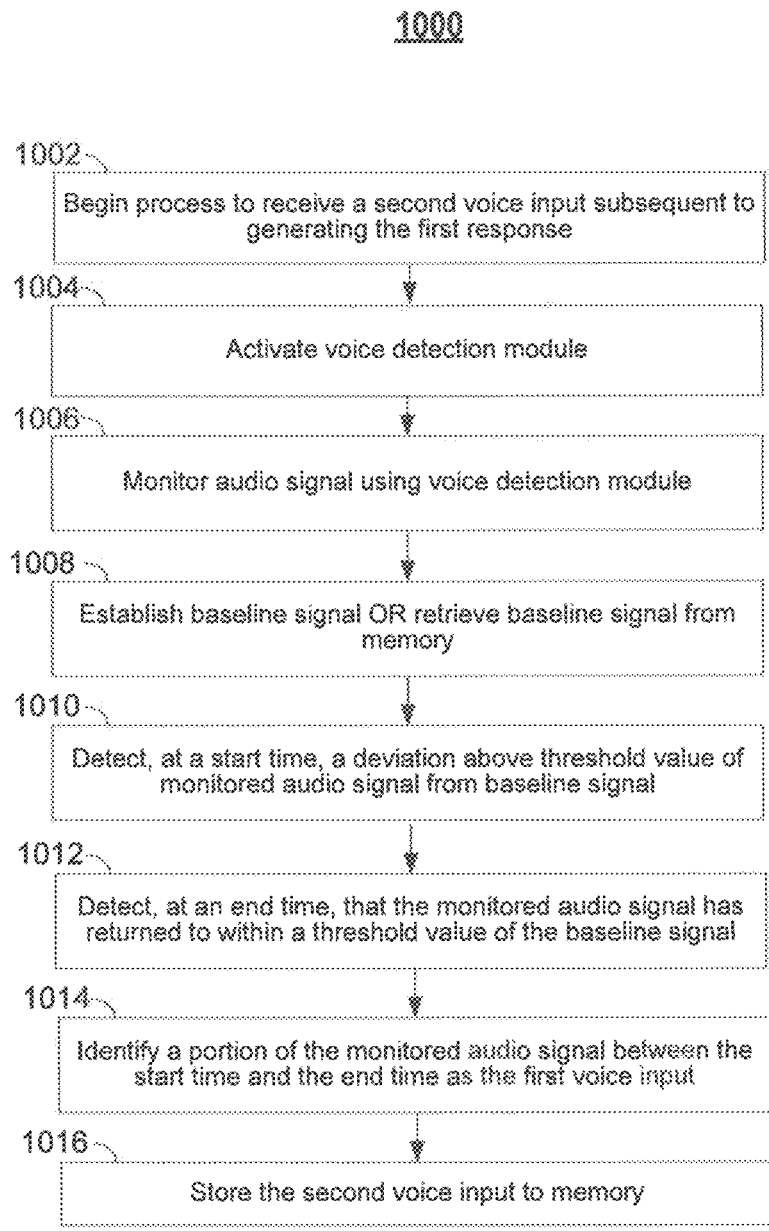
FIG. 10 is a flowchart of illustrative steps for receiving a second voice input subsequent to generating the first response in accordance with some embodiments of the disclosure.

FIG. 10 is a flowchart 1000 of illustrative steps for receiving a second voice input subsequent to generating the first response. Flowchart 1000 describes the steps that a control circuitry may take to receive and store a second voice input to memory. The steps of FIG. 10 may be substantially similar to the steps discussed above in relation to FIG. 6. At 1002, the process to receive a second voice input may begin. In some embodiments, the process may begin either directly or indirectly in response to a request from the user or a user action, such as an input into user input interface 310. For example, the process may begin directly in response to control circuitry 304 receiving signals from user input interface 310 or control circuitry 304 may prompt the user to confirm their input using a display (such as display 312) prior to running the process. In some embodiments, the control circuitry 304 may ping either local storage 308 or remote storage, such as media guidance data source 418, to determine whether the storage is available and ready to store the second voice input. The control circuitry 304 may also initialize any variables necessary to store the second voice input. For example, the control circuitry 304 may initialize an array in memory to store audio signals for successive time periods. In some embodiments, the control circuitry 304 may allocate a one-dimensional variable to continuously store a stream of audio.

At 1004, the control circuitry 304 may activate the voice detection module, such as detection module 316. For example, the voice detection module may include a microphone or any other audio detection hardware suitable for detecting and recording audio signals. At 1006, the control circuitry 304 may monitor an audio signal using the voice detection module. For example, the control circuitry 304 may receive the audio signal using the voice detection module and store and/or continuously stream the audio signal to memory. In some embodiments, the control circuitry 304 may continuously record audio from the second voice input to the second voice input. At 1008, the control circuitry 304 may establish a baseline signal. For instance, the control circuitry 304 may monitor a certain period of time of silence and/or background noise. As will be understood by those of skill in the art, suitable audio analytics, including performing low/high/band-pass filtering and/or transform analysis may be performed in order to identify and isolate the baseline signal.

At 1010, the control circuitry 304 may detect, at a start time, a deviation above threshold value of monitored audio signal from baseline signal. For instance, the threshold value may include a threshold decibel level above silence, and the control circuitry 304 may detect that the monitored audio signal has exceeded that threshold decibel level, thus indicating the start of a voice input. In some embodiments, the control circuitry 304 may first remove the baseline signal using audio analysis techniques, as will be understood by those of skill in the art. As an illustrative example, the control circuitry 304 may develop a signature frequency profile of the baseline signal, representing the background noise. The control circuitry 304 may remove this signature frequency profile from a currently detected audio signal in order to remove the background noise, and may then detect whether the resulting audio signal exceeds a threshold value.

At 1012, the control circuitry 304 may detect, at an end time, that the monitored audio signal has returned to within a threshold value of the baseline signal. For example, similar to 1010 discussed above, the threshold value may be a threshold decibel level, and the control circuitry 304 may detect when the monitored audio signal drops below the threshold decibel level. As discussed above in 1010, the control circuitry 304 may first remove a signature frequency profile of background noise from the monitored audio signal before determining whether the signal has dropped below the threshold value. In some embodiments, the control circuitry 304 detects whether there has been silence for a predetermined amount of time. For example, a period of silence of 1 s may indicate that the user has finished his or her query to the media guidance application. At 1014, the control circuitry 304 may identify a portion of the monitored audio signal between the start time and the end time as the second voice input and store the second voice input to memory at 1016.

Figure 11:
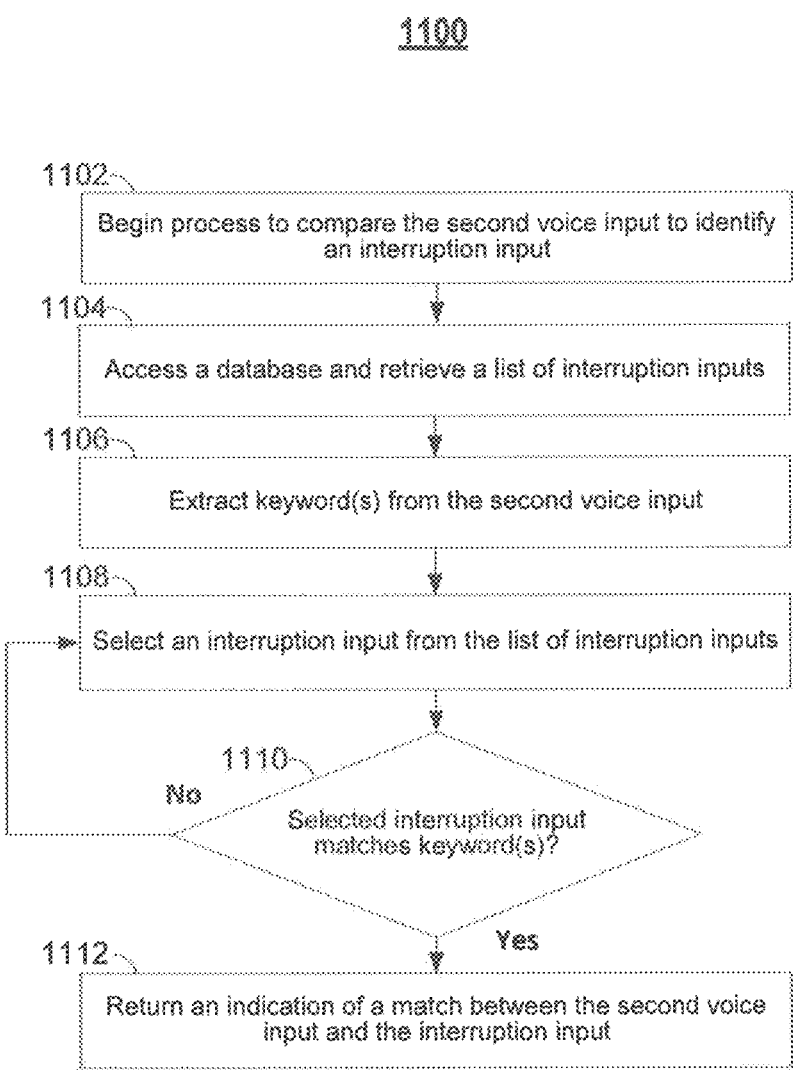
FIG. 11 is a flowchart of illustrative steps for comparing the second voice input to identify an interruption input in accordance with some embodiments of the disclosure.

FIG. 11 is a flowchart 1100 of illustrative steps for comparing the second voice input to identify an interruption input. Flowchart 1100 describes the process by which control circuitry 304 may compare the second voice input to a list of interruption inputs in order to identify whether the second voice input includes an appropriate interruption input. At 1102, the process to compare the second voice input to identify an interruption input may begin. In some embodiments, the process may begin either directly or indirectly in response to a request from the user or a user action, such as an input into user input interface 310. For example, the process may begin directly in response to control circuitry 304 receiving signals from user input interface 310 or control circuitry 304 may prompt the user to confirm their input using a display (such as display 312) prior to running the process.

At 1104, the control circuitry 304 may access a database and retrieve a list of interruption inputs. In some embodiments the database storing the list of interruption inputs may be the same database as the database of topics. In some embodiments the database storing the list of interruption inputs may be a different database as the database of topics. The database storing the list of interruption inputs may be stored in any suitable storage, including local storage 308 and remote storage, such as media guidance data source 418.

At 1106, the control circuitry 304 may extract keyword(s) from the second voice input. 1106 may be substantially similar to 804 discussed above in relation to FIG. 8. In some embodiments, extracting keywords from the second voice input may include converting the audio signal of the second voice input into a text format using suitable audio recognition software. The converted text may be parsed or grouped into suitable keywords and/or phrases. In some embodiments, the keywords may be extracted as audio samples of the second voice input. The control circuitry 304 may use suitable audio recognition software to separate the individual words and/or phrases spoken by the user in the second voice input. For instance, the control circuitry 304 may detect brief pauses or periods of silence in the second voice input to delineate words or phrases.

At 1108, the control circuitry 304 may select an interruption input from the list of interruption input. At 1110, the control circuitry 304 may compare the selected interruption input to the extracted keyword(s) to determine whether there is a match. 1110 may be substantially similar to 810 discussed above in relation to FIG. 8. For instance, the selected interruption input may be compared to the extracted keywords in any suitable manner, including a text-to-text comparison, text-to-audio comparison, audio-to-text comparison, or audio-to-audio comparison. If none of the extracted keywords match the selected interruption input, then the control circuitry 304 may return to 1108. If one or more keywords match, then the control circuitry may continue to 1112 and return an indication of a match between the second voice input and the interruption input.

Figure 12:
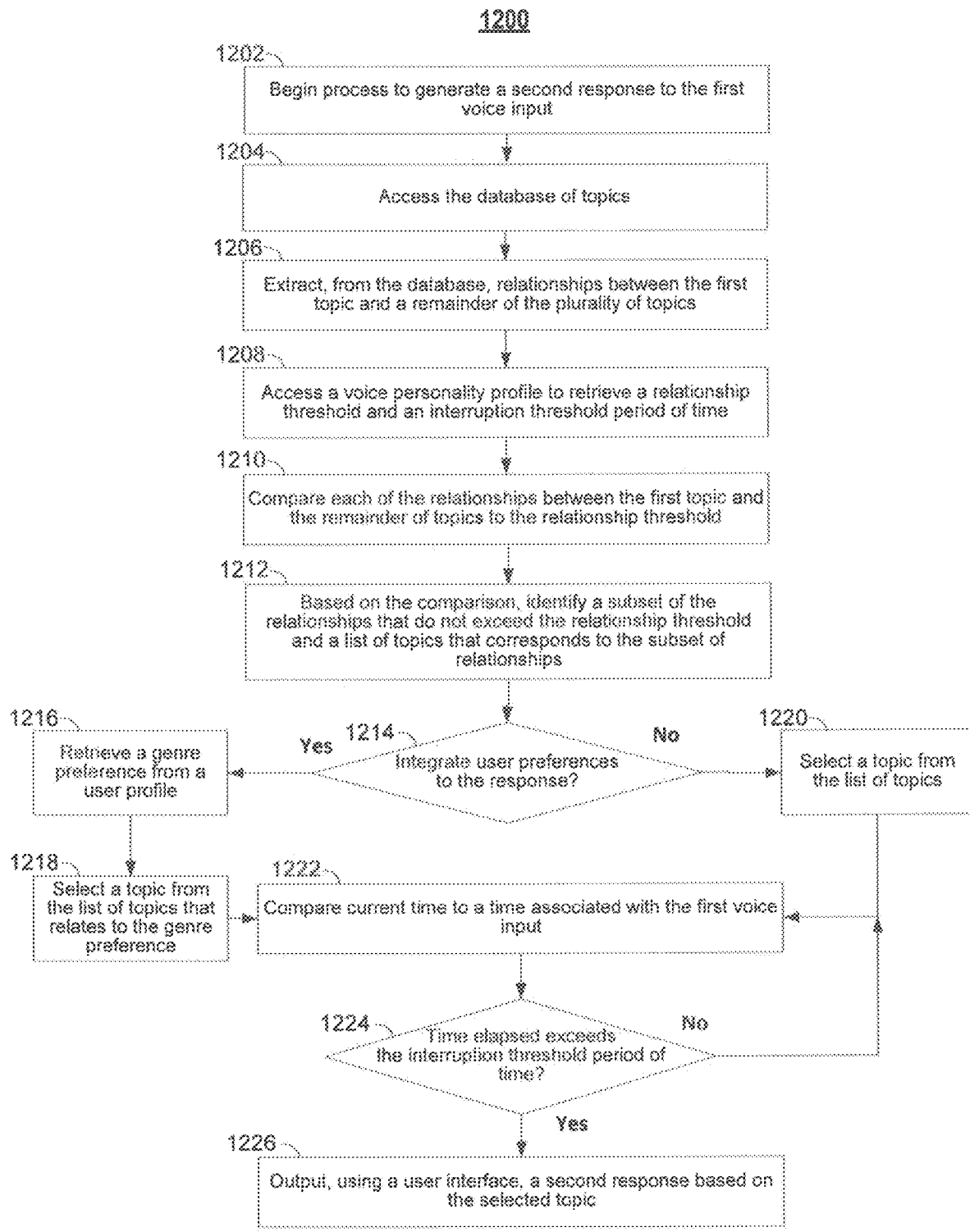
FIG. 12 is a flowchart of another set of illustrative steps for generating a second response to the first voice input in accordance with some embodiments of the disclosure.

FIG. 12 is a flowchart 1200 of another set of illustrative steps for generating a second response to the first voice input. FIG. 12 describes the process by which a control circuitry 304 may change the subject, including how to integrate user preferences into the response and when to wait for an appropriate time to respond. At 1202, the process to generate a second response to the first voice input may begin. In some embodiments, the process may begin either directly or indirectly in response to a request from the user or a user action, such as an input into user input interface 310. For example, the process may begin directly in response to control circuitry 304 receiving signals from user input interface 310 or control circuitry 304 may prompt the user to confirm their input using a display (such as display 312) prior to running the process.

1204 to 1212 of FIG. 12 may be substantially similar to 904 to 912 of FIG. 9, discussed above. At 1208, the control circuitry 304 may further retrieve an interruption threshold period of time from the voice personality profile. At 1214, the control circuitry 304 may determine whether to integrate user preferences to the generated response. For example, the control circuitry 304 may identify whether an option to integrate user preferences into the media guidance application's voice responses has been selected by the user. If the user preferences are not to be integrated into the response, then the control circuitry may continue to 1220 and select a topic from the list of topics. 1220 may be substantially similar to 914 discussed above in relation to FIG. 9. If the user preferences are to be integrated into the response, then the control circuitry 304 may retrieve a genre preference from the user profile at 1216. At 1218, the control circuitry 304 may select a topic from the list of topics that relates to the genre preference. For instance, the control circuitry 304 may filter the subset of topics based on the genre preference and select one of the resulting topics. At 1222, the control circuitry 304 may compare a current time to a time associated with the first voice input in order to calculate a time elapsed. For example, the control circuitry 304 may access the current time from a clock or other timekeeping hardware and may retrieve the time associated with the first voice input, such as a timestamp, from storage, such as local storage 308. The control circuitry may take a difference of the current time and the time associated with the first voice input to calculate the time elapsed.

At 1224, the control circuitry 304 may determine whether the time elapsed exceeds the interruption threshold period of time. If the time elapsed does not exceed the interruption threshold period of time, then the control circuitry 304 may return to 1222 until the time elapsed does exceed the threshold period of time. This may occur in a situation where the user does not wish to be interrupted with frequency greater than the interruption threshold period of time. If the time elapsed exceeds the interruption threshold period of time, then the control circuitry 304 may continue to 1226 and output, using the user interface, a second response based on the selected topic. 1226 may be substantially similar to 916 described above in relation to FIG. 9. In some embodiments, 1226 includes generating a full sentence based on the selected topic. In some embodiments, the control circuitry 304 may access a list of responses that have been previously authored by a human, wherein each of the list of responses leaves a blank to insert a relevant keyword. In such instances, the control circuitry 304 may access a list of keywords associated with the selected topic, select one of the responses from the list of responses, and input a keyword into the blank in order to compose the full sentence.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing a follow-up response to a conversational input based on detecting a user hesitation to an initial response, the method comprising:
    receiving, using control circuitry, a first input;
    generating, using a user interface, a first response to the first input;
    subsequent to generating the first response, receiving, using the control circuitry, a voice input followed by a period of silence;
    in response to receiving the voice input followed by the period of silence, comparing the voice input to a plurality of verbal cues indicative of hesitations;
    determining, based on the comparing, that the voice input matches a verbal cue of the plurality of verbal cues; and
    in response to determining that the voice input matches the verbal cue, generating, using the user interface, a second response to the first input.

2. The method of claim 1, further comprising:
    accessing, using the control circuitry, a database of topics comprising a semantic network indicating relationships between a plurality of topics;
    identifying, using the control circuitry, a first topic that is associated with the first input from the database of topics; and
    generating, using the user interface, the second response to the first input comprising a media asset recommendation associated with a second topic related to the first topic in the database of topics.

3. The method of claim 2, further comprising:
    extracting, from the database, relationships between the first topic and a remainder of the plurality of topics;
    comparing each of the relationships between the first topic and the remainder of the plurality of topics to a relationship threshold; and
    storing to memory a list indicating a subset of the relationships between the first topic and the remainder of the plurality of topics that do not exceed the relationship threshold and a list of topics of the plurality of topics that correspond to the subset of the relationships;
    wherein the second topic is selected from the list of topics.

4. The method of claim 2, wherein the semantic network comprises numerical relationships between the plurality of topics, the numerical relationships indicating a statistical likelihood that the second topic is related to the first topic.

5. The method of claim 4, further comprising:
    receiving a plurality of voice inputs from a plurality of users;
    identifying a first subset of the plurality of voice inputs that relate to the first topic;
    identifying, from the first subset of the plurality of voice inputs, a second subset of the plurality of voice inputs relating to the second topic; and
    calculating a statistical likelihood, based on the identified first subset of the plurality of voice inputs and second subset of the plurality of voice inputs, that the second topic follows the first topic.

6. The method of claim 2, further comprising:
    accessing, using the control circuitry, a user profile indicating media preferences of a user;
    retrieving a genre preference from the user profile;
    identifying a subset of the plurality of topics that are associated with the retrieved genre; and
    selecting the second topic from the subset of the plurality of topics.

7. The method of claim 2, wherein the database of topics indicates a respective genre associated with each respective topic of the plurality of topics, further comprising:
    extracting, from the database of topics, a genre associated with the first topic;
    identifying a subset of the plurality of topics that are associated with the extracted genre; and
    selecting the second topic from the subset of the plurality of topics.

8. The method of claim 1, further comprising:
    receiving, using the control circuitry, a third voice input;
    comparing the third voice input to the plurality of verbal cues to determine a match between the third voice input and a second verbal cue from the plurality of verbal cues;
    determining whether a threshold period of time has elapsed between a current time and the second response; and
    in response to determining that the threshold period of time has elapsed between the current time and the second response, generating, using the user interface, a third response to the first input.

9. The method of claim 1, further comprising:
    receiving an identifier of a user associated with the first input;
    accessing, using the control circuitry, a plurality of voice personality profiles, each voice personality profile corresponding to a respective user and comprising indications of a respective plurality of verbal cues; and
    selecting one of the plurality of voice personality profiles based on the identifier of the user associated with the first input;
    wherein comparing the voice input to the plurality of verbal cues comprises comparing the voice input to the indications of the respective plurality of verbal cues associated with the selected voice personality profiles.

10. The method of claim 9, further comprising:
    extracting a threshold period of time from the selected voice personality profile; and
    calculating a time elapsed since the first input by comparing a current time to a receipt time associated with the first input;
    wherein generating the second response is performed in response to determining that the time elapsed has exceeded the threshold period of time.

11. A system for providing a follow-up response to a conversational input based on detecting a user hesitation to an initial response, the system comprising:
    a user interface; and
    control circuitry configured to:
        receive, using control circuitry, a first input;

generate, using a user interface, a first response to the first input;

subsequent to generating the first response, receive, a voice input followed by a period of silence;

in response to receiving the voice input followed by the period of silence, compare the voice input to a plurality of verbal cues indicative of hesitations;

determine, based on the comparing, that the voice input matches a verbal cue of the plurality of verbal cues; and in response to determining that the voice input matches the verbal cue, generate, using the user interface, a second response to the first input.

12. The system of claim 11, wherein the control circuitry is further configured to:

access a database of topics comprising a semantic network indicating relationships between a plurality of topics;

identify a first topic that is associated with the first input from the database of topics; and generate, using the user interface, the second response to the first input comprising a media asset recommendation associated with a second topic related to the first topic in the database of topics.

13. The system of claim 12, further comprising a memory, wherein the control circuitry is further configured to:

extract, from the database, relationships between the first topic and a remainder of the plurality of topics;

compare each of the relationships between the first topic and the remainder of the plurality of topics to a relationship threshold; and store to the memory a list indicating a subset of the relationships between the first topic and the remainder of the plurality of topics that do not exceed the relationship threshold and a list of topics of the plurality of topics that correspond to the subset of the relationships;

select the second topic from the list of topics.

14. The system of claim 12, wherein the semantic network comprises numerical relationships between the plurality of topics, the numerical relationships indicating a statistical likelihood that the second topic is related to the first topic.

15. The system of claim 14, wherein the control circuitry is further configured to:

receive a plurality of voice inputs from a plurality of users;

identify a first subset of the plurality of voice inputs that relate to the first topic;

identify, from the first subset of the plurality of voice inputs, a second subset of the plurality of voice inputs relating to the second topic; and calculate a statistical likelihood, based on the identified first subset of the plurality of voice inputs and second subset of the plurality of voice inputs, that the second topic follows the first topic.

16. The system of claim 12, wherein the control circuitry is further configured to:

access a user profile indicating media preferences of a user;

retrieve a genre preference from the user profile;

identify a subset of the plurality of topics that are associated with the retrieved genre; and select the second topic from the subset of the plurality of topics.

17. The system of claim 12, wherein the database of topics indicates a respective genre associated with each respective topic of the plurality of topics, wherein the control circuitry is further configured to:

extract, from the database of topics, a genre associated with the first topic;

identify a subset of the plurality of topics that are associated with the extracted genre; and select the second topic from the subset of the plurality of topics.

18. The system of claim 11, wherein the control circuitry is further configured to: receive a third voice input;

compare the third voice input to the plurality of verbal cues to determine a match between the third voice input and a second verbal cue from the plurality of verbal cues;

determine whether a threshold period of time has elapsed between a current time and the second response; and in response to determining that the threshold period of time has elapsed between the current time and the second response, generate, using the user interface, a third response to the first input.

19. The system of claim 11, wherein the control circuitry is further configured to:

receive an identifier of a user associated with the first input;

access a plurality of voice personality profiles, each voice personality profile corresponding to a respective user and comprising indications of a respective plurality of verbal cues;

select one of the plurality of voice personality profiles based on the identifier of the user associated with the first input; and compare the voice input to the indications of the respective plurality of verbal cues associated with the selected voice personality profiles.

20. The system of claim 19, wherein the control circuitry is further configured to:

extract a threshold period of time from the selected voice personality profile;

calculate a time elapsed since the first input by comparing a current time to a receipt time associated with the first input; and generate the second response is performed in response to determining that the time elapsed has exceeded the threshold period of time.

\* \* \* \* \*